United States Patent
Hoefer et al.

(10) Patent No.: US 6,312,513 B1
(45) Date of Patent: Nov. 6, 2001

(54) PIGMENT CONCENTRATES CONTAINING DIMERDIOLALKOXYLATE ADDITIVES, AND METHODS OF PREPARING SAME

(75) Inventors: Rainer Hoefer, Duesseldorf; Heinz-Guenther Schulte, Muelheim; Hans-Christian Raths; Harald Frommelius, both of Monheim; Stefan Gollnick, Neuss; Ulrich Pegelow, Duesseldorf, all of (DE)

(73) Assignee: Cognis Deutschland GmbH, Duesseldorf (DE)

( * ) Notice: Subject to any disclaimer, the term of this patent is extended or adjusted under 35 U.S.C. 154(b) by 0 days.

(21) Appl. No.: 09/530,708

(22) PCT Filed: Oct. 24, 1998

(86) PCT No.: PCT/EP98/06763

§ 371 Date: Aug. 7, 2000

§ 102(e) Date: Aug. 7, 2000

(87) PCT Pub. No.: WO99/23173

PCT Pub. Date: May 14, 1999

(30) Foreign Application Priority Data

Nov. 4, 1997 (DE) .............................. 197 48 575

(51) Int. Cl.[7] .......................... C09B 67/20; C09B 67/46; C09D 17/00
(52) U.S. Cl. ................... 106/499; 106/413; 106/460; 106/476; 106/493; 106/497; 106/504
(58) Field of Search .................. 106/499, 493, 106/504, 460, 476, 497, 413

(56) References Cited

U.S. PATENT DOCUMENTS

| | | | |
|---|---|---|---|
| 3,841,888 | 10/1974 | Belde et al. | 106/173.01 |
| 3,947,287 | * 3/1976 | Belde et al. | 106/413 |
| 4,117,249 | 9/1978 | De Simone et al. | 368/855 |
| 4,226,637 | 10/1980 | Linden et al. | 106/499 |
| 5,336,313 | 8/1994 | Bunte et al. | 106/504 |
| 5,340,394 | * 8/1994 | Elsamanoudi | 106/500 |
| 5,855,662 | 1/1999 | Brand et al. | 106/498 |

FOREIGN PATENT DOCUMENTS

| | | |
|---|---|---|
| 26 28 145 A1 | 12/1976 | (DE) . |
| 39 20 130 A1 | 1/1991 | (DE) . |
| 195 11 669 A1 | 10/1996 | (DE) . |
| 0 002 683 A | 7/1979 | (EP) . |
| 0 565 709 B1 | 10/1993 | (EP) . |
| 0 585 571 A1 | 3/1994 | (EP) . |
| 0 735 109 A2 | 10/1996 | (EP) . |
| 2160507 A | 6/1973 | (FR) . |
| 861223 | 2/1961 | (GB) . |
| WO96/07689 | 3/1996 | (WO) . |

OTHER PUBLICATIONS

Database WPI, Section Ch, Week 9714, Derwent Publications Ltd., London, GB; AN 97–149915, XP002095492 & JP 09 025443 A (Sakata Inks Co Ltd), Jan. 28, 1997.

Chemical Abstracts, vol. 104, No. 12, Mar. 24, 1986, Columbus, Ohio, US; Abstract No. 90588, XP002095491 & CS 217 250 A.

Database WPI, Section Ch, Week 9732, Derwent Publications Ltd., London, GB; AN 97–347659, XP002095493 & JP 09 143416 A (Sakata Inks Co Ltd), Jun. 3, 1997.

H. Kittel, Lehrbuch der Lacke und Beschichtungen, vol. III, Verl. W.A. Colomb, Berlin, Oberschwandorf, (1976), pp. 239–259 (No month).

J.V. Robinson, et al., Dispersants in Paper Coating Additives, Monograph No. #25, TAPPI, Atlanta, (1963), pp. 41–71 (No month).

J.D. Schofield, Polymeric Dispersants, Handbook of Coating Additives, L.J. Calbo (Ed.), vol. 2, Marcel Dekker, New York, Basel, Hong Kong, (1992), pp. 71–104 (No month).

C. Baumann, et al., "Stabilierungssysteme Fuer die Herstellung von Polymer–Dispersionen", Welt der Farben, (Feb., 1996), pp. 15–21.

A.G. Hinze, Fette & Öle, vol. 26, (1994), pp. 47–51 (No month).

L.S. Newton, "Dimer Acids and Their Derivatives—Potential Applications", Specialty Chemicals, May, 1984, pp. 17, 18, 22–24 (No month).

Daute, et al., Fat. Sci. Technol., vol. 95, (1993), pp. 91–94 (No month).

Neumüller, Römpps Chemie Lexikon, 7th Ed., Stuttgart, (1974), pp. 2693–2695 (No month).

* cited by examiner

Primary Examiner—Anthony Green
(74) Attorney, Agent, or Firm—John E. Drach; Aaron R. Ettelman

(57) ABSTRACT

Pigment concentrates comprising a pigment, a liquid carrier medium and a dimerdiolalkoxylate, wherein a dimer portion of the dimerdiolalkoxylate comprises from about 36 to about 44 carbon atoms, and wherein the at least one dimerdiolalkoxylate has from about 1 to about 200 moles of alkylene oxide per mole of dimerdiol, are described in conjunction with methods of preparing the same.

20 Claims, No Drawings

PIGMENT CONCENTRATES CONTAINING DIMERDIOLALKOXYLATE ADDITIVES, AND METHODS OF PREPARING SAME

BACKGROUND OF THE INVENTION

Pigment concentrates are produced by digesting pigments in a liquid carrier medium using shearing machines and thus finally dispersing them in such a way that the pigment is permanently present in the form of the primary particles. Suitable shearing machines are known to the expert and are described, for example, in C. H. Hare, Protective Coatings—Fundamentals of Chemistry and Composition, Technology Publishing Comp., Pittsburgh (1994)

which is particularly concerned with American technologies. In view of the importance of dispersion to the lacquer, paint and printing ink industry, both the dispersion process and the low molecular weight and relatively high molecular weight compounds suitable for stabilizing the primary particles are described in detail in the specialist literature, cf. for example:

H. Kittel, Lehrbuch der Lacke und Beschichtungen, Vol. III, pages 239 et seq, Verl. W. A. Colomb, Berlin, Oberschwandorf (1976)

J. V. Robinson, R. N. Thompson, Dispersants, in Paper Coating Additives, Monograph No. 25, TAPPI, Atlanta 1963

J. D. Schofield, Polymeric Dispersants, in Handbook of Coating Additives, L. J. Calbo (Ed.), Vol. 2, Marcel Dekker, New York Basel, Hong Kong (1992).

There is no teaching to be derived from the known prior art on the choice of particular additives which effectively support the formulation of pigment concentrates, particularly where these pigment concentrates are intended to allow the production of low-emission or even emission-free paints and printing inks or when they are intended to be free from ecologically or ecotoxicologically unsafe substances.

One particular difficulty lies in the formulation of water-based pigment concentrates, particularly if no low molecular weight co-solvents, such as ethylene glycol or propylene glycol, are to be added. Thus, although so-called pigment dispersants based on polyphosphates or polyacrylates, as the expert well knows, are eminently suitable for keeping pigments and fillers suspended in emulsion paints in conjunction with the latex particles stabilized by emulsifiers or protective colloids, they are not suitable for the production of pigment concentrates with the requirement profile described above.

Most dispersants, which are perfectly suitable in organic carrier oils differing in polarity, fail when water is selected as the continuous phase for the pigment concentrates. Surfactant-based dispersants with a good wetting effect on pigments, such as alkylphenol polyglycol ethers (cf. for example GB 861 223) have recently entered the ecological debate so far as their biodegradability is concerned both in the detergent industry, where they have already been completely replaced as surfactants in Germany, and in emulsion polymerization processes, i.e. in the production of water-based binders for emulsion paints, cf.:

C. Baumann, D. Feustel, U. Held, R. Höfer, "Stabilisierungssysteme für die Herstellung von Polymer-Dispersionen", in: Welt der Farben, pages 15 et seq. (February 1996)

Another complication affecting the choice of additives for the formulation of pigment concentrates is that the dispersing additive has to be selected so that, largely irrespective of the carrier oil, the viscosity of the continuous phase decreases with increasing shear force, i.e. must be pseudoplastic and definitely not dilatant.

Another factor which has to be taken into account in the formulation of pigment concentrates is that a special balance has to be established between water retention capacity and hygroscopicity so that the drying of the concentrate is significantly retarded. Partly dried pigment concentrates are intended to be readily redispersible. On the other hand, water retention capacity and hygroscopicity should not be so high that the final coating is sensitive to water.

Other performance properties of the final paint, such as stability to freezing/thawing, stability in storage, shear stability, should be as little affected in a negative sense as the properties of the cured film, for example transparency, gloss or resistance to blushing.

Another particular requirement to be satisfied by the pigment concentrates to be provided in accordance with the present invention is that they should be compatible with a broad range of binders, organic and inorganic pigments which, in turn, are mostly dispersed in so-called basic lacquers, and at the same time both with water and with the various solvents used in paints and with the highly alkaline waterglasses used in silicate paints.

On an industrial scale, a large percentage of liquid paints is produced by preparing the polymeric binder in a separate stage and then mixing it with the other constituents to form the final paint. If pigmenting is intended to be carried out at this early stage, the pigment is ground with the binder in a preliminary step carried out either in a high-speed mixer or in a dissolver and is then diluted down to the in-use concentration. DIY paints and paints for the professional decorator both for interior and exterior application are of particular interest in connection with the present invention. The binders for these paints are produced by emulsion polymerization in aqueous phase. In practice, the aqueous phase often contains volatile organic solvents, so-called coalescing agents, which are added either during the polymerization itself or at a later stage and which support film formation by partly dissolving the latex particles and promote levelling. The smell of these coalescing agents, particularly the known and widely used isobutyric acid-2,2,4-trimethyl-3-hydroxypentyl ester (Texanol®), remains noticeable for several days in freshly painted rooms. However, it is becoming increasingly more unacceptable in modern society. Accordingly, there is an interest in keeping modern paints completely free from such coalescing agents and other volatile solvents and co-solvents and in ensuring that they are not carried over into the paints by the pigment concentrates.

Besides the coloring of paints at the production stage, a significant percentage is only colored immediately before use either to establish special tones or to meet special customer requirements. In these cases, an industrially preformed pigment concentrate is added to and mixed with a white or pastel-colored stock paint. This customer-oriented method of coloring can be carried out both by hand and on a semi-industrial or full industrial scale. In cases such as these, the pigment concentrate is generally mixed in a ratio of 5 to 200 ml per 1 stock paint. A combination of two or three different pigment pastes is often needed to obtain the required color tone. The pigment concentrates usually contain high pigment concentrations, i.e. the pigment volume concentration (or PVC for short) is normally between 10 and 80%.

Ethylene oxide adducts with special glycols containing a —C≡C— group as structural element are known from DE-A-26 28 145. These compounds are said to be suitable as humectants, dispersants, nonionic antifoam agents and viscosity stabilizers and to develop their effect in aqueous solution in lower concentrations than conventional surfactants. Beyond listing the above-mentioned applications, however, DE-A-26 28 145 does not disclose any other concrete details or embodiments.

EP 565 709 B1 discloses water-based inkjet inks which contain polyol/alkylene oxide condensates as co-solvent. According to page 4, lines 9 to 15 of this document, the polyol contains in particular 3 or more OH groups. The polyols explicitly mentioned include in particular special triols, such as glycerol, trimethylol propane, trimethylol ethane, 1,2,4-butanetriol and 1,2,6-hexanetriol; tetrols, such as pentaerythritols and di(tri-methylol propane), pentols, such as glucose, and hexols such as sorbitol and inositol. However, the use of diols is described as unsatisfactory. In this connection, it has been found that alkylene oxide condensates of diols are generally not compatible with pigment dispersions with the possible exception of neopentyl glycol alkoxylates.

DE 195 11 669 A1 describes the use of dimerdiol alkoxylates as thickeners for water-based surface-active compositions, i.e. laundry detergents, dishwashing detergents and cleaners and also hair care and body care formulations.

WO 96/7689 discloses copolymers with the general formula $(A—COO)_2—B$, where A has a molecular weight of at least 500 and is the residue of an oil-soluble complex monocarboxylic acid of special structure and B has a molecular weight of at least 500 and is the divalent residue of an alkyl glycol or a polyalkylene glycol. The copolymers according to WO 96/7689 are said to be suitable for dispersing inorganic pigments in organic media.

EP 735 109 A2 describes water-based pigment preparations which contain inter alia 10 to 80% of a pigment and 0.1 to 20% of an alkoxylation product obtained by addition of optionally substituted styrenes onto optionally substituted phenols and reaction with ethylene oxide and/or propylene oxide.

DE 39 20 130 A1 describes the use of partial esters of oligoglycerols with fatty acids as pigment dispersants for water-based lacquer dispersions. The partial esters mentioned may optionally be ethoxylated and/or propoxylated.

The problem addressed by the present invention was to provide effective additives for the production of pigment concentrates and the pigment concentrates obtainable with these additives which would meet the numerous criteria mentioned above in regard to the desirable property profile of such additives or the pigment concentrates themselves.

BRIEF SUMMARY OF THE INVENTION

The present invention includes the use of dimerdiolalkoxylates in the preparation of pigment concentrates, and includes methods of preparing the same. The present invention also includes pigment concentrates comprising a pigment, a dimerdiolalkoxylate in accordance with the present invention, and a liquid carrier medium. Pigment concentrates of the present invention are preferably aqueous, and thus, the preferred liquid carrier medium is water.

In a first embodiment, the present invention relates to the use of dimerdiol alkoxylates as additives for the production of pigment concentrates. Dimerdiol alkoxylates in the context of the present invention are understood to be products of the addition of 1 to 200 moles ethylene oxide and/or propylene oxide onto dimerdiols predominantly containing 36 to 44 carbon atoms.

Dimerdiols are well-known, commercially available compounds which are obtained, for example, by reduction of dimer fatty acid esters. The dimer fatty acids on which these dimer fatty acid esters are based are carboxylic acids which are obtainable by oligomerization of unsaturated carboxylic acids, generally fatty acids, such as oleic acid, linoleic acid, erucic acid and the like. The oligomerization is normally carried out at elevated temperature in the presence of a catalyst of, for example, clay. The substances obtained (dimer fatty acids of technical quality) are mixtures in which the dimerization products predominate. However, small percentages of higher oligomers, more particularly the trimer fatty acids, are also present. Dimer fatty acids are commercially available products and are offered in various compositions and qualities. Abundant literature is available on the subject of dimer fatty acids, of which the following articles are examples:

Fette & Öle 26 (1994), pages 47–51

Speciality Chemicals 1984 (May Number), pages 17, 18, 22–24

DETAILED DESCRIPTION OF THE INVENTION

The dimerdiols on which the dimerdiol alkoxylates to be used in accordance with the invention are based are well known among experts, cf. for example a fairly recent article which discusses inter alia the production, structure and chemistry of dimerdiols:

Fat Sci. Technol. 95 (1993) No. 3, pages 91–94

According to the invention, preferred dimerdiol alkoxylates are those which are derived from dimerdiols with a dimer content of at least 50% and, more particularly, 75% and in which the number of carbon atoms per dimer molecule is predominantly in the range from 36 to 44. Dimerdiol ethoxylates containing 1 to 30 moles ethylene oxide per mole dimerdiol are most particularly preferred.

In one preferred embodiment, the present invention relates to the use of dimerdiol alkoxylates as additives for the production of water-based pigment concentrates.

The quantity of dimerdiol alkoxylates to be used in accordance with the invention is determined on the one hand by the nature of the dyes to be dispersed and by the quantity of the dyes to be dispersed. The dimerdiol alkoxylates are preferably used in a quantity of 0.1 to 20% by weight, based on the pigment dispersion as a whole.

The production of the dimerdiol alkoxylates may be carried out by any of the methods known to the expert from the literature. In general, the required dimerdiol is alkoxylated by standard methods. The standard method of alkoxylation comprises contacting an alcohol (in the case of the present invention a dimerdiol) with ethylene oxide and/or propylene oxide and reacting the resulting mixture at temperatures of 20 to 200° C. in the presence of an alkaline catalyst. In this way, adducts of ethylene oxide (EO) and/or propylene oxide (PO) with the particular dimerdiol used are obtained. Accordingly, the addition products are EO adducts or PO adducts or EO/PO adducts with the particular dimerdiol used. In the case of the EO/PO adducts, the addition of EO and PO may be carried out statistically or in blocks.

The present invention also relates to pigment concentrates containing a) 10 to 80% by weight of one or more pigments, b) 0.1 to 20% by weight of one or more dimerdiol alkoxylates based on dimerdiols predominantly containing 36 to 44 carbon atoms, these compounds containing 1 to 200 moles ethylene oxide and/or propylene oxide per mole dimerdiol, and c) 15 to 85% by weight of a liquid carrier medium.

The dimerdiol alkoxylates present in the pigment concentrates according to the invention are nitrogen-free and are free from hydrolyzable ester or aldehyde groups which is of particular advantage so far as the application in question here is concerned.

According to the invention, there are basically no restrictions on the choice of the pigments a). As known to the expert, pigments are particulate organic or inorganic materials which are substantially insoluble in solvents or binders and which can have either a coloring effect or a flatting/matting effect of their own. Many inorganic pigments also act as fillers and vice versa. Examples of particularly widely used classes of pigments can be found in the relevant literature, for example:

Otto-Albrecht Neumüller, Römpps Chemie-Lexikon, 7the Edition, Stuttgart 1974, pages 2693–2695.

The pigment concentrates according to the invention preferably contain compounds containing 1 to 30 moles ethylene oxide and/or propylene oxide per mole dimerdiol as the dimerdiol alkoxylates b).

Liquid carrier media c)—for example organic carrier oils or water—are known to the expert. In one preferred embodiment, water is used as the liquid carrier medium. In this case, the pigment concentrates are water-based.

In another embodiment, the pigment concentrates according to the invention additionally contain 0.1 to 30% by weight of one or more surfactants d) from the group of alkyl polyglycosides (as described in more detail hereinafter), fatty alcohol polyglycol ethers (as described in more detail hereinafter) and styryl phenol polyglycol ethers (as known for example from the above-cited EP-A-735 109) besides the compulsory components a), b) and c).

Alkyl polyglycosides may be characterized by general formula (IV):

$$R-(G)_p \quad (IV)$$

where R is a linear saturated alkyl chain containing 8 to 22 carbon atoms and $(G)_p$ is a glycoside or oligoglycoside unit with a degree of oligomerization x of 1 to 10, for deinking waste paper. Alkyl glycosides corresponding to general formula (IV) are very well-known surface-active agents which can be obtained by acetalization from sugars and aliphatic, primary alcohols containing 8 to 22 carbon atoms. A preferred sugar component (glycoses) is glucose although fructose, mannose, galactose, telose, gulose, allose, altrose, idose, arabinose, xylose, lyxose, libose and mixtures thereof may also be used. By virtue of their ready availability and their favorable performance properties, the acetalization products of glucose with fatty alcohols obtainable, for example, from natural fats and oils by known methods, more particularly with linear, primary, saturated and unsaturated $C_{8-22}$ fatty alcohols are preferably used. So far as the glycoside unit $(G)_p$ is concerned, both monoglycosides (p=1), where a sugar unit is attached to the fatty alcohol by a glycoside linkage, and oligomeric glycosides with a degree of oligomerization p of 2 to 10 are suitable. Mixtures of mono- and oligoglycosides are generally present. Alkyl glycosides (IV), where R is an alkyl containing 8 to 22 carbon atoms and $(G)_p$ is a glycoside or oligoglycoside unit with a degree of oligomerization p of 1 to 10, are particularly suitable. In one most particularly preferred embodiment, R is an alkyl group containing 8 to 14 carbon atoms. The average degree of oligomerization is preferably in the range from 1 to 1.5.

Fatty alcohol polyglycol ethers may be characterized by general formula (V):

$$R^9-O-(CH_2-CHR^{10}-O)_qH \quad (V)$$

where $R^9$ is a linear saturated alkyl chain containing 8 to 22 carbon atoms, $R^{10}$ is hydrogen or a methyl group and the index q is a number of 1 to 50. Particularly preferred compounds (V) are fatty alcohol ethoxylates, more especially addition products of 2 to 20 moles ethylene oxide per mole fatty alcohol containing 12 to 18 carbon atoms.

In another embodiment, the pigment concentrates according to the invention additionally contain 0.1 to 30% by weight of one or more co-addicts e) from the group of polyethylene glycols and polyglycol ethers (obtainable by ethoxylation of 1,2- or 1,3-propanediol, 1,2- or 1,4-butanediol, hexanediol, glycerol, trimethylol propane or pentaerythritol), these compounds having a molecular weight of 200 to 10,000 and preferably in the range from 200 to 600, in addition to the compulsory components a), b) and c).

The pigment concentrates according to the invention may additionally contain other ingredients typical of pigment concentrates in addition to the above-mentioned compulsory components a), b) and c). Examples of such ingredients are defoamers, preservatives, drying retarders and anti-settling agents.

The pigment concentrates according to the invention are suitable for coloring paints, for example by the amateur or by the professional in paint banks or even by the paint manufacturer. However, the pigment concentrates according to the invention may also be used for coloring other paints or coatings, such as printing inks, leather finishes, wall-covering paints, wood varnishes, wood protection systems and wood stains, overprinting lacquers or air- or oven-drying industrial lacquers, and for pigmenting colored pencils, fiber-tip pens, inkjet inks, Chinese inks, pastes for ballpoint pens, shoe care creams, nonwoven fabrics, paper coatings and paper stock, cardboard printing inks, dope dyes and films.

The following Examples are intended to illustrate the invention without limiting it in any way.

EXAMPLES

1. Substances Used 1.1. Pigments

Pr 101: Pigment with Colour Index PR (pigment red) 101; "Bayferrox 120 M" (Bayer AG) was used.

PV 19: Pigment with Colour Index PV (pigment violet) 19; "Hostaperm rotviolet ER 02" (Hoechst AG) was used.

PG 7: Pigment with Colour Index PG (pigment green) 7; (Sunfast grün 7 264-0414" (Sun Chemicals) was used.

PBk 7: Pigment with Colour Index PR (pigment black) 7; "Spezialschwarz 4" (Degussa AG) was used.

1.2. Anti-settling Agent

Xanthan gum "Deuteron VT 819" (Wilhelm O. C. Schöner GmbH, Achim)

1.3. Defoamer

Silicone defoamer "Dehydran 3282" (Henkel KGaA, Düsseldorf)

1.4. Additives According to the Invention

Add-1: Addition product of 10 moles of ethylene oxide onto 1 mole of a dimerdiol containing 36 to 44 carbon atoms 1.5. White Emulsion Paints or Lacquers Disp-1: Emulsion paint based on vinyl acetate/ethylene copolymer ("Vinnapast EZ 36", Wacker Chemie)

Disp-2: Emulsion paint based on styrene acrylate ("Acronal 290D", BASF)

Disp-3: Emulsion lacquer based on pure acrylate ("Neocryl XK90", Zeneca Resins, NL)

2. Preparation of the Pigment Pastes (Pigment Concentrates)

2.1. Example B-1

33.4 Parts by weight of water were initially introduced, 6.0 parts by weight of additive Add-1 were added with stirring and the resulting mixture was homogenized. 60 Parts by weight of pigment PR 101 were then added and the whole was homogenized using a dissolver (Dispermat CV, manufacturer: Getzmann, Reinhardshagen). Dimethyl ethanolamine was carefully added to the premix obtained in this way in such a quantity that a pH value of 8 was obtained. 0.4 Part by weight of the defoamer mentioned under No. 1.3. and 0.2 part by weight of the anti-settling agent mentioned under No. 1.2. were then added and the whole was dispersed for 30 minutes at 2000 r.p.m. using a stirrer-equipped ball mill operating on the circulation principle (Dispermat SL, manufacturer: Getzmann, Reinhardshagen).

2.2. Example B-2

54.6 Parts by weight of water were initially introduced, 15 parts by weight of additive Add-1 were added with stirring and the resulting mixture was homogenized. 30 Parts by weight of pigment PV 19 were then added and the whole was homogenized using a dissolver (Dispermat CV, manufacturer: Getzmann, Reinhardshagen). Dimethyl ethanolamine was carefully added to the premix obtained in this way in such a quantity that a pH value of 8 was obtained. 0.4 Part by weight of the defoamer mentioned under No. 1.3. was then added and the whole was dispersed for 60 minutes at 3500 r.p.m. using a stirrer-equipped ball mill operating on the circulation principle (Dispermat SL, manufacturer: Getzmann, Reinhardshagen).

2.3. Example B-3

48.6 Parts by weight of water were initially introduced, 11 parts by weight of additive Add-1 were added with stirring and the resulting mixture was homogenized. 40 Parts by weight of pigment PG 7 were then added and the whole was homogenized using a dissolver (Dispermat CV, manufacturer: Getzmann, Reinhardshagen). Dimethyl ethanolamine was carefully added to the premix obtained in this way in such a quantity that a pH value of 8 was obtained. 0.4 Part by weight of the defoamer mentioned under No. 1.3. was then added and the whole was dispersed for 60 minutes at 4000 r.p.m. using a stirrer-equipped ball mill operating on the circulation principle (Dispermat SL, manufacturer: Getzmann, Reinhardshagen).

2.4. Example B-4

58.6 Parts by weight of water were initially introduced, 16 parts by weight of additive Add-1 were added with stirring and the resulting mixture was homogenized. 25 Parts by weight of pigment PBk 7 were then added and the whole was homogenized using a dissolver (Dispermat CV, manufacturer: Getzmann, Reinhardshagen). Dimethyl ethanolamine was carefully added to the premix obtained in this way in such a quantity that a pH value of 8 was obtained. 0.4 Part by weight of the defoamer mentioned under No. 1.3. was then added and the whole was dispersed for 90 minutes at 4000 r.p.m. using a stirrer-equipped ball mill operating on the circulation principle (Dispermat SL, manufacturer: Getzmann, Reinhardshagen).

3. Performance Tests

The pigment pastes obtained in accordance with 2.1. to 2.4. (Examples B-1 to B4) were tested for their viscosity behavior and for their compatibility with white emulsion paints or lacquers. The results are set out in Tables 1 to 3.

3.1. Viscosity Behavior

The viscosities of the pigment pastes according to Examples B-1 to B-4 were measured at room temperature (Brookfield LVT, 30 r.p.m., spindle 2–4, after stirring for 1 minute)

a) after storage for 24 hours at 20° C. and
b) after storage for 4 weeks at 40° C.

The values in Table 1 are in mPas.

TABLE 1

| Viscosity behavior | | | | |
|---|---|---|---|---|
| | B-1 | B-2 | B-3 | B-4 |
| Viscosity after 24 hours | 800 | 4200 | 300 | 150 |
| Viscosity after 4 weeks | 900 | 4400 | 310 | 180 |

3.2. Rubout

To determine rubout, quantities of 10% by weight (based on the white emulsion paint used or the emulsion lacquer used) of the pigment pastes of Examples B-1 to B-4 were added to and homogeneously mixed with the white emulsion paints or lacquers Disp-1 to Disp-3. The formulations obtained were then applied in a thin layer (150 micrometers wet layer thickness) to contrast paper cards (Erichson Type "7.32/7")

a) immediately afterwards and
b) after storage for 4 weeks at 40° C.

After about 3 minutes, the mixture applied was rubbed with a finger in the lower third of the test card, after which the color tones of the unrubbed surface were compared with the color of the rubbed surface (using a Dr. Lange Microcolor to the CIELAB standard, light type D65, 10°). The resulting ΔE values are set out in Table 2a (formulations directly used) and 2b (formulations stored for 4 weeks). As the expert knows, ΔE values of 0.3 to 0.5 are regarded as very good in the specialist technical field in question here; ΔE values of 0.5 to about 1.2 are regarded as good while ΔE values above 1.0 are unacceptable.

TABLE 2a

| Rubout data of directly used formulations | | | | |
|---|---|---|---|---|
| | B-1 | B-2 | B-3 | B-4 |
| Disp-1 | 0.4 | 0.4 | 0.4 | 0.6 |
| Disp-2 | 0.5 | 0.5 | 0.6 | 0.3 |
| Disp-3 | 0.4 | 0.3 | 0.4 | 0.4 |

TABLE 2b

| Rubout data of formulations stored for 4 weeks | | | | |
|---|---|---|---|---|
| | B-1 | B-2 | B-3 | B-4 |
| Disp-1 | 0.5 | 0.4 | 0.6 | 0.6 |
| Disp-2 | 0.4 | 0.5 | 0.5 | 0.4 |
| Disp-3 | 0.5 | 0.4 | 0.4 | 0.5 |

3.3. Gloss

To determine gloss, quantities of 10% by weight (based on the white emulsion paint used or the emulsion lacquer used) of the pigment pastes according to Examples B-1 to B-4 or added to and homogeneously mixed with the white emulsion paints or lacquers Disp-1 to Disp-3. The formulations obtained were then applied in a thin layer (150 micrometers wet layer thickness) to contrast paper cards (Erichson Type "7.32/7")

a) immediately afterwards and
b) after storage for 4 weeks at 40° C.

After drying, gloss was determined with a Dr. Lange gloss meter at angles of 85° and 60°. The results are set out in Tables 3a (formulations directly used) and 3b (formulations stored for 4 weeks).

The gloss of the white emulsion paints or lacquers, i.e. the unmodified polymer dispersions Disp-1 to Disp-3 not colored with pigment pastes B-1 to B-4 according to the invention, was also determined for comparison. These reference values are also included for comparison purposes in Tables 3a and 3b under the column heading "reference".

TABLE 3a

Gloss data of directly used formulations

| | Measuring angle | Reference | B-1 | B-2 | B-3 | B-4 |
|---|---|---|---|---|---|---|
| Disp-1 | 85° | 3 | 3 | 3 | 3 | 3 |
| Disp-2 | 85° | 5 | 5 | 5 | 5 | 5 |
| Disp-3 | 60° | 44 | 44 | 46 | 46 | 44 |

TABLE 3b

Gloss data of formulations stored for 4 weeks

| | Measuring angle | Reference | B-1 | B-2 | B-3 | B-4 |
|---|---|---|---|---|---|---|
| Disp-1 | 85° | 3 | 3 | 3 | 3 | 3 |
| Disp-2 | 85° | 5 | 5 | 5 | 5 | 5 |
| Disp-3 | 60° | 45 | 46 | 46 | 47 | 45 |

What is claimed is:

1. A method of preparing a pigment concentrate, said method comprising:
   (a) providing at least one dimerdiolalkoxylate, wherein a dimer portion of the dimerdiolalkoxylate comprises from about 36 to about 44 carbon atoms, and wherein the at least one dimerdiolalkoxylate has from about 1 to about 200 moles of alkylene oxide per mole of dimerdiol;
   (b) combining the at least one dimerdiolalkoxylate with a pigment and a liquid carrier medium; and
   (c) mixing the at least one dimerdiolalkoxylate, the pigment and the liquid carrier medium to form a pigment concentrate.

2. The method according to claim 1, wherein a dimer portion of the dimerdiolalkoxylate comprises from about 36 to about 44 carbon atoms, and wherein the at least one dimerdiolalkoxylate has from about 1 to about 30 moles of alkylene oxide per mole of dimerdiol.

3. The method according to claim 1, wherein the alkylene oxide is selected from the group consisting of ethylene oxide, propylene oxide and mixtures thereof.

4. The method according to claim 1, wherein the at least one dimerdiolalkoxylate is present in an amount of from about 0.1 to about 20% by weight, based on the total weight of the pigment concentrate.

5. The method according to claim 2, wherein the at least one dimerdiolalkoxylate is present in an amount of from about 0.1 to about 20% by weight, based on the total weight of the pigment concentrate.

6. The method according to claim 3, wherein the at least one dimerdiolalkoxylate is present in an amount of from about 0.1 to about 20% by weight, based on the total weight of the pigment concentrate.

7. The method according to claim 1, wherein the liquid carrier medium comprises water.

8. The method according to claim 4, wherein the liquid carrier medium comprises water.

9. A pigment concentrate comprising a pigment, a liquid carrier medium and at least one dimerdiolalkoxylate, wherein a dimer portion of the dimerdiolalkoxylate comprises from about 36 to about 44 carbon atoms, and wherein the at least one dimerdiolalkoxylate has from about 1 to about 200 moles of alkylene oxide per mole of dimerdiol.

10. The pigment concentrate according to claim 9, wherein a dimer portion of the dimerdiolalkoxylate comprises from about 36 to about 44 carbon atoms, and wherein the at least one dimerdiolalkoxylate has from about 1 to about 30 moles of alkylene oxide per mole of dimerdiol.

11. The pigment concentrate according to claim 9, wherein the alkylene oxide is selected from the group consisting of ethylene oxide, propylene oxide and mixtures thereof.

12. The pigment concentrate according to claim 9, wherein the pigment is present in an amount of from about 10 to about 80% by weight, the liquid carrier medium is present in an amount of from about 15 to about 85% by weight, and the at least one dimerdiolalkoxylate is present in an amount of from about 0.1 to about 20% by weight, all percent weights being based on the total weight of the pigment concentrate.

13. The pigment concentrate according to claim 10, wherein the pigment is present in an amount of from about 10 to about 80% by weight, the liquid carrier medium is present in an amount of from about 15 to about 85% by weight, and the at least one dimerdiolalkoxylate is present in an amount of from about 0.1 to about 20% by weight, all percent weights being based on the total weight of the pigment concentrate.

14. The pigment concentrate according to claim 9, wherein the pigment is present in an amount of from about 25 to about 60% by weight, the liquid carrier medium is present in an amount of from about 30 to about 60% by weight, and the at least one dimerdiolalkoxylate is present in an amount of from about 4 to about 15% by weight, all percent weights being based on the total weight of the pigment concentrate.

15. The pigment concentrate according to claim 10, wherein the pigment is present in an amount of from about 25 to about 60% by weight, the liquid carrier medium is present in an amount of from about 30 to about 60% by weight, and the at least one dimerdiolalkoxylate is present in an amount of from about 4 to about 15% by weight, all percent weights being based on the total weight of the pigment concentrate.

16. The pigment concentrate according to claim 9, wherein the liquid carrier medium comprises water.

17. The pigment concentrate according to claim 9, further comprising at least one surfactant selected from the group consisting of alkylpolyglycosides, fatty alcohol polyglycol ethers, and styrylphenol polyglycol ethers.

18. The pigment concentrate according to claim 17, wherein the at least one surfactant is present in an amount of from about 0.1 to about 30% by weight, based on the total weight of the pigment concentrate.

19. The pigment concentrate according to claim 9, further comprising at least one coadditive selected from the group consisting of polyethylene glycols and polyglycol ethers.

20. The pigment concentrate according to claim 17, wherein the at least one coadditive is present in an amount of from about 0.1 to about 30% by weight, based on the total weight of the pigment concentrate.

* * * * *